United States Patent
Laurent et al.

(10) Patent No.: US 9,267,792 B2
(45) Date of Patent: Feb. 23, 2016

(54) METHOD AND APPARATUS FOR COMPENSATING LATERAL DISPLACEMENTS AND LOW SPEED VARIATIONS IN THE MEASURE OF A LONGITUDINAL PROFILE OF A SURFACE

(71) Applicant: Systèmes Pavemetrics Inc., Québec (CA)

(72) Inventors: John Laurent, Saint-Augustin-de-Desmaures (CA); Richard Habel, Québec (CA); Mario Talbot, Québec (CA)

(73) Assignee: Systèmes Pavemetrics Inc., Quebec (CA)

( * ) Notice: Subject to any disclaimer, the term of this patent is extended or adjusted under 35 U.S.C. 154(b) by 318 days.

(21) Appl. No.: 13/746,111

(22) Filed: Jan. 21, 2013

(65) Prior Publication Data

US 2014/0207411 A1    Jul. 24, 2014

(51) Int. Cl.
| | | |
|---|---|---|
| *G01B 11/14* | (2006.01) | |
| *G01B 11/30* | (2006.01) | |
| *G06F 17/00* | (2006.01) | |
| *G01B 11/26* | (2006.01) | |
| *G01B 11/06* | (2006.01) | |
| *G01S 17/42* | (2006.01) | |
| *G01S 17/88* | (2006.01) | |

(52) U.S. Cl.
CPC .......... *G01B 11/30* (2013.01); *G01B 11/06* (2013.01); *G01B 11/26* (2013.01); *G06F 17/00* (2013.01); *G01S 17/42* (2013.01); *G01S 17/88* (2013.01)

(58) Field of Classification Search
None
See application file for complete search history.

(56) References Cited

U.S. PATENT DOCUMENTS

| | | | | |
|---|---|---|---|---|
| 4,741,207 A | * | 5/1988 | Spangler | 73/146 |
| 5,163,319 A | * | 11/1992 | Spies et al. | 73/146 |
| 6,775,914 B2 | | 8/2004 | Toom | |
| 2003/0030546 A1 | * | 2/2003 | Tseng | 340/425.5 |
| 2007/0219720 A1 | * | 9/2007 | Trepagnier et al. | 701/300 |

(Continued)

OTHER PUBLICATIONS

Laurent, "Three-Dimensional Sensors for Automated Detection of Road Surface Defects (P12-5449)", Transportation Research Board 91st Annual Meeting, Jan. 22, 2012, 57 pages, Pavemetrics Systems Inc., Washington D.C.

(Continued)

*Primary Examiner* — Paul D Lee
(74) *Attorney, Agent, or Firm* — Robert Plotkin, P.C.; Robert Plotkin

(57) ABSTRACT

Measuring a distance to a surface while compensating for variations in a transverse position and/or low speed displacement of the instrument. One method includes retrieving a predetermined transversal distance from a longitudinal feature at which to extract a relevant distance; retrieving a distance set; retrieving a position of the longitudinal feature relative to the distance set; extracting a range point at the predetermined transversal distance from the longitudinal feature; adding the extracted point to a longitudinal distance set. In another method, if two sensors are provided with an overlap in the transversal direction, extracting a range point at a predetermined transversal position; adding the extracted range point to a longitudinal distance set; retrieving a pitch angle of the instrument; calculating a local slope of the surface using an overlapping transversal point, the pitch angle and the separation length; calculating a height variation using the local slope and a longitudinal separation.

19 Claims, 12 Drawing Sheets

(56) References Cited

U.S. PATENT DOCUMENTS

| | | | |
|---|---|---|---|
| 2010/0034426 A1* | 2/2010 | Takiguchi et al. | 382/106 |
| 2010/0157283 A1* | 6/2010 | Kirk et al. | 356/28 |
| 2010/0299109 A1* | 11/2010 | Saito | 703/1 |
| 2011/0234450 A1* | 9/2011 | Sakai et al. | 342/70 |
| 2011/0282581 A1* | 11/2011 | Zeng | 701/301 |
| 2012/0154785 A1* | 6/2012 | Gilliland et al. | 356/5.01 |
| 2012/0213412 A1* | 8/2012 | Murashita | 382/104 |

OTHER PUBLICATIONS

Sayers et al., "The little Book of Profiling", Sep. 1998, 102 pages, The Regent of the University of Michigan, United States.

Gillepsie, "Everything You Always Wanted to Know about the IRI But Were Afraid to Ask" Road Porfile Users Group Meeting, Sep. 22-24, 1992, 14 pages, Lincoln, Nebraska, United States.

The American Society for Testing and Materials, "Standard Practice for Calculating Pavement Macrotexture Mean Profile Depth", Designation E 1845-01, Sep. 2001, 4 pages, West Conshohocken, PA, United States.

American Association of State Highway and Transportation Officials, "Standard Practice for Certification of Inertial Profiling Systems", ASSHTO Designation: R 56-10, 2011, 10 pages, Washington, D.C., United States.

* cited by examiner

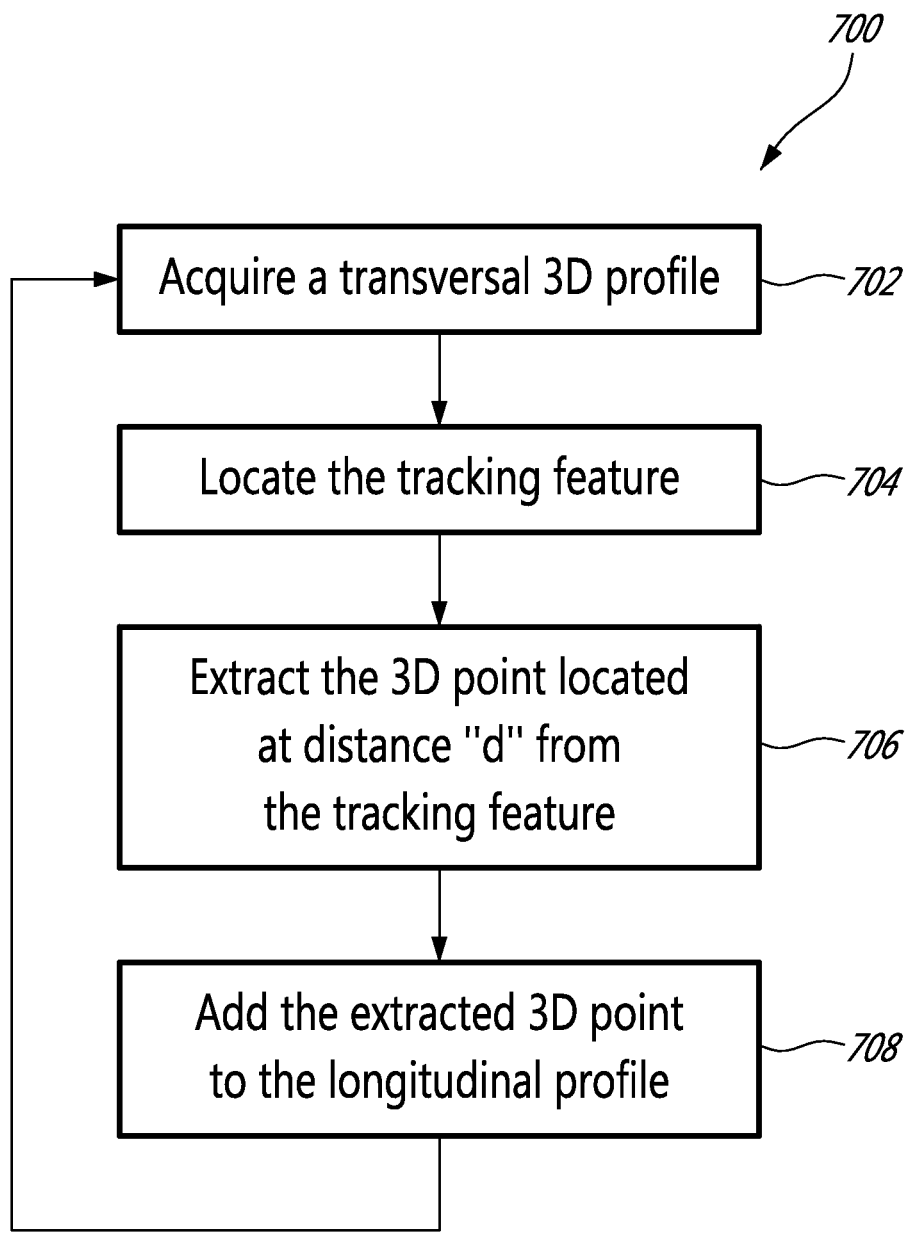

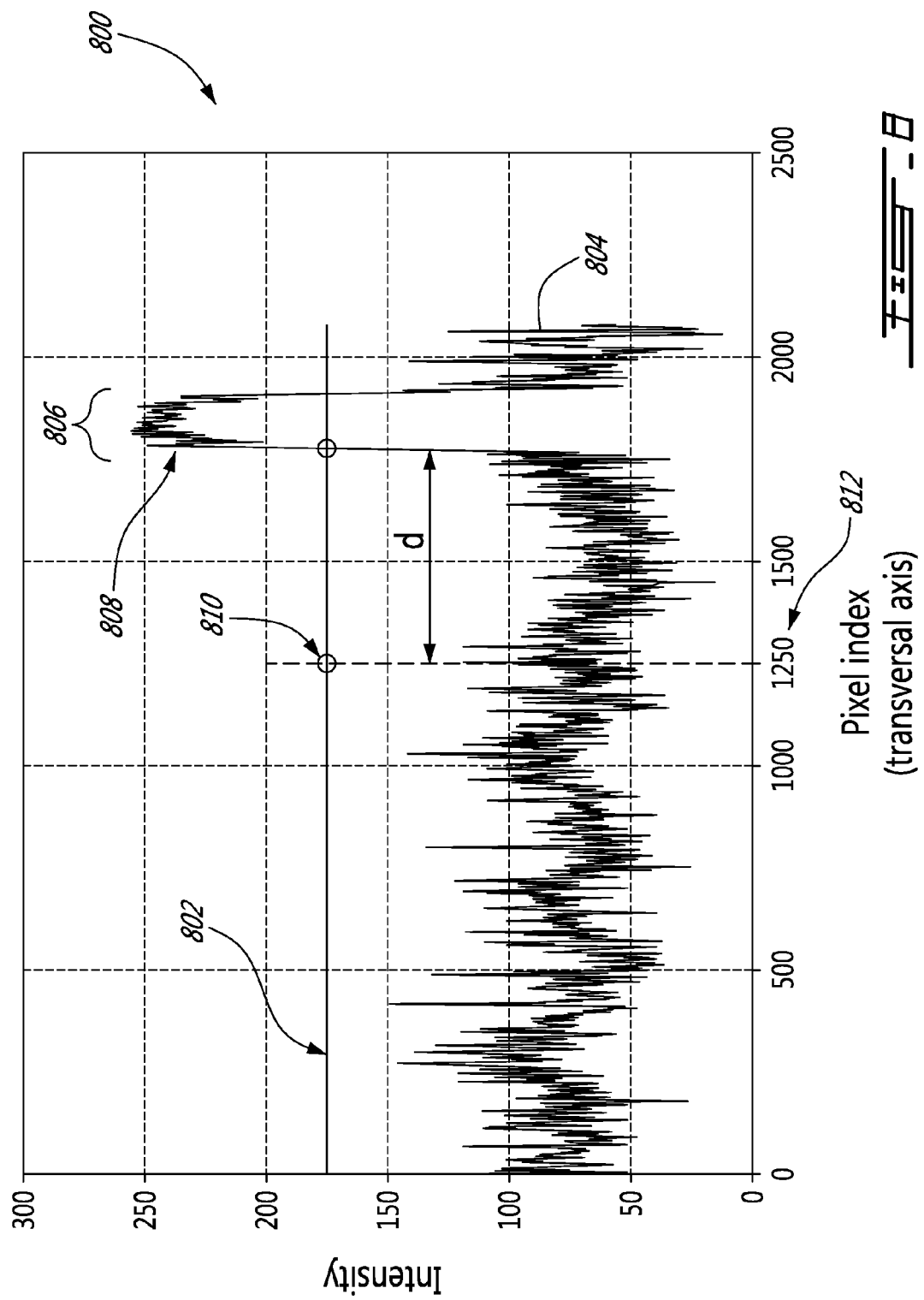

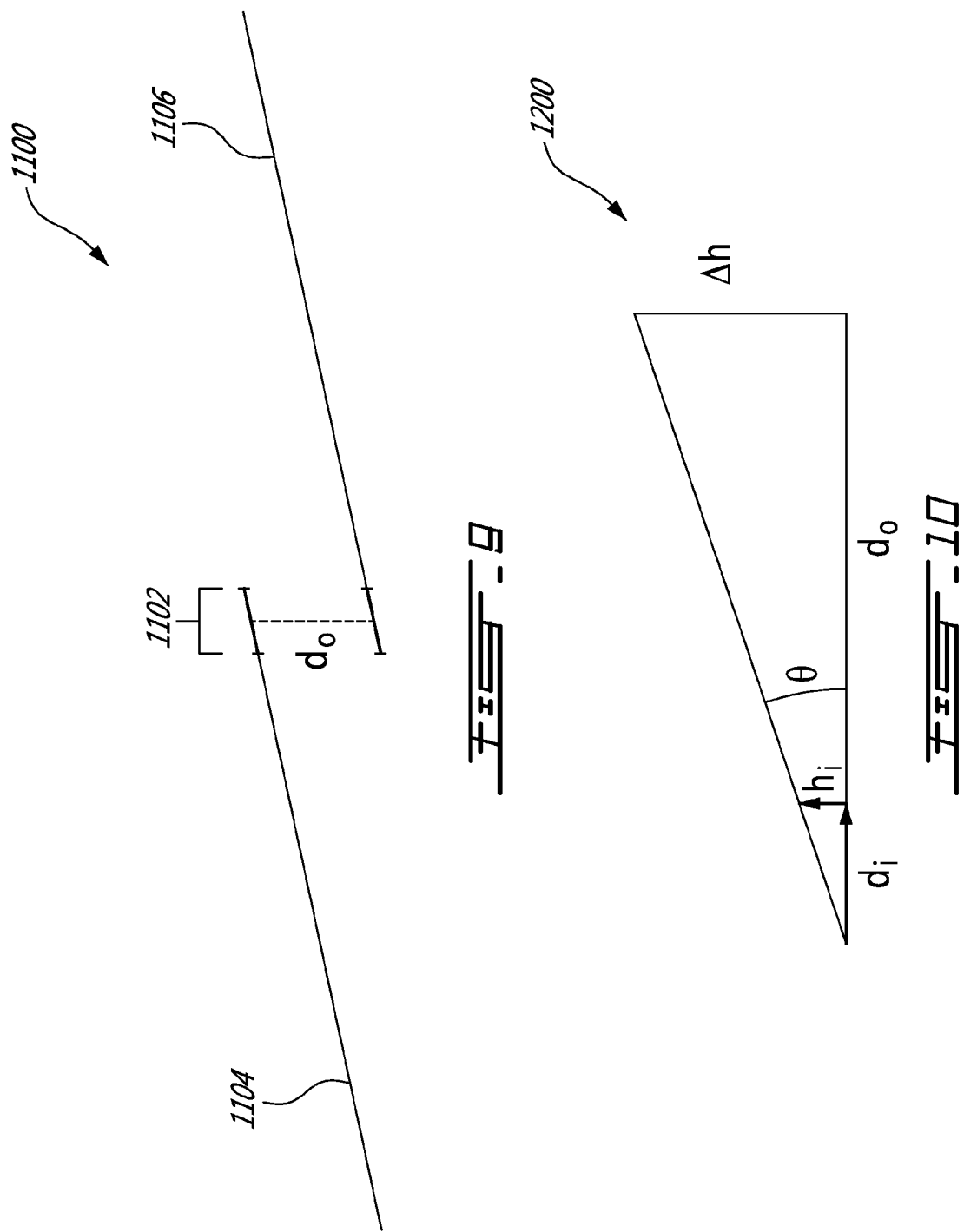

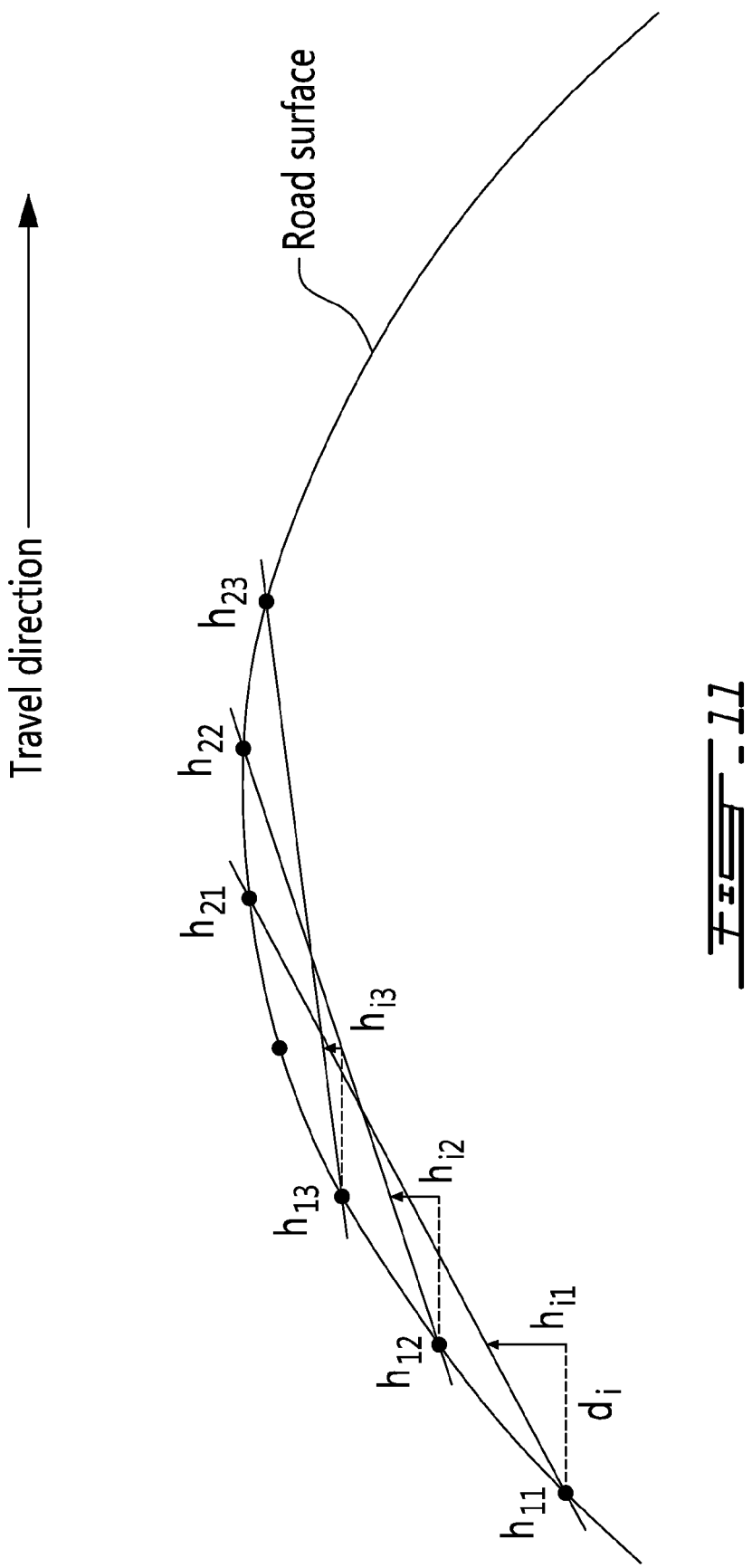

METHOD AND APPARATUS FOR COMPENSATING LATERAL DISPLACEMENTS AND LOW SPEED VARIATIONS IN THE MEASURE OF A LONGITUDINAL PROFILE OF A SURFACE

TECHNICAL FIELD

This invention relates generally to the inspection of transportation infrastructures and in particular to the compensation for lateral movement and low speed variations of the measurement instrument.

BACKGROUND OF THE ART

In order to measure surface features and the longitudinal profile of a road to be inspected, a number of pavement condition indicators and characteristics are measured. The International Roughness Index (IRI) characterizes the pavement condition. FIG. 1 (Prior Art) shows the longitudinal profile measurement in the ideal case. An aerial view of a section of a road to be inspected 100 is shown. The inspection vehicle 102 travels between the lane markings 104 along a trajectory 106 following the longitudinal axis 108 of the road. The number of measured profiles in the transversal axis 110 captured by the inspection vehicle 102 with its inspection system 112 can extend from 1 to N where N is the number of 3D measurement points available in the transversal axis 110. In most systems, the number of 3D points is limited to one or two. In the special case where N is high and the 3D measurement points are distributed so as to cover the width of the road, an image representing the road elevation can be formed. The inspection vehicle 102 travels between the lane markings 104 and captures the longitudinal profile measurement 116 at a predefined distance d to one of the lane markings 104. In the example shown, the predefined distance d is from the right hand side marking 118.

In conventional systems, an acquisition instrument called a profilometer is used for the measurement of the longitudinal profile of roads. This acquisition instrument includes two single point range sensors and Inertial Measurement Units (IMUs) mounted in the wheel path of the inspection vehicle. The single point range sensors are used to measure the distance between the IMUs and the road and the IMUs are used to estimate the total change in elevation of the road and the inspection vehicle while in motion. By subtracting the two measurements, it is possible to measure only the variations in elevation of the road surface, that is, the longitudinal profile. Most of the time, the integration of the signal from a vertically oriented accelerometer (the simplest form of IMU) can be used to track the total elevation changes of both the road surface and the inspection vehicle. FIG. 2 (Prior Art) illustrates an acquisition instrument used to measure the longitudinal profile of the road 100. The acquisition instrument 200 is equipped with two single point 3D sensors 202 and two IMUs 204 or two accelerometers mounted on the inspection vehicle 102. The 3D sensors 202 are usually positioned in the wheel path.

In some systems, the single point range sensors are replaced with multipoint laser line profilers that cover a road width of a few inches. These types of laser line profilers are used to compensate for different road surface textures such as longitudinally tinned (striated) concrete surfaces. FIG. 3 (Prior Art) shows an alternative configuration 300 for the longitudinal profile measurement using a line of single point 3D sensors 302. IMUs 304 can still be present. This configuration adds robustness against texture variations on the road surface.

Both the profilers using single point range sensors and the limited width laser line sensors are very sensitive to the lateral shift of the inspection vehicle.

To help the driver follow the same trajectory in each run, a guide line is often painted on the road surface. Even guided as such, it is very difficult for the driver/operator to perfectly align the profiler with the reference line and to do this with little positional variations for multiple passes while driving at highway speeds. Lateral movement will occur. Since the measurement trajectory is different for each survey even when captured on the same road section, the longitudinal profile and the indicators calculated will also be different. FIG. 4 (Prior Art) shows the longitudinal profile measurement 400 with a single point system when lateral movement is present. Since the inspection vehicle followed a wavy trajectory 402 on the road 100, the resulting longitudinal profile 404 was also measured along a wavy trajectory instead of being measured on the ideal straight line trajectory 116.

This non-ideal measurement trajectory 402 limits the performance and repeatability of the system for road monitoring applications.

SUMMARY

In methods and apparatus for longitudinal profile measurement, 3D sensors covering a large portion or the total width of the surface and feature tracking are used to compensate for lateral shifts and low speed variations of the inspection vehicle.

Methods and Systems for measuring a distance to a surface while compensating for variations in a transverse position and/or low speed displacement of the instrument are provided.

One method includes retrieving a predetermined transversal distance from a longitudinal feature at which to extract a relevant distance; retrieving a distance set; retrieving a position of the longitudinal feature relative to the distance set; extracting a range point at the predetermined transversal distance from the longitudinal feature; adding the extracted point to a longitudinal distance set.

In another method, if two sensors are provided with an overlap in the transversal direction, extracting a range point at a predetermined transversal position; adding the extracted range point to a longitudinal distance set; retrieving a pitch angle of the instrument; calculating a local slope of the surface using an overlapping transversal point, the pitch angle and the separation length; calculating a height variation using the local slope and a longitudinal separation.

According to one aspect of the present invention, there is provided a system for measuring a distance to a surface along a longitudinal direction of the surface using an acquisition instrument while compensating for variations in a transverse position of the acquisition instrument, the surface having a longitudinally-aligned feature. The system comprises an acquisition instrument including a multipoint range sensor acquiring the distance between the acquisition instrument and the surface, the multipoint range sensor acquiring the distance in a field of view of the acquisition instrument at a multitude of transversal points, thereby acquiring a distance set, the field of view having a transversal dimension and a longitudinal dimension along the longitudinal direction of the surface, the transversal dimension being longer than the longitudinal dimension; a translation mechanism for displacing the acquisition instrument to allow the acquisition instrument to acquire the distance set at a plurality of positions along the longitudinal direction; a processor for: retrieving a position of the longitudinally-aligned feature of the surface relative to the field of view of the acquisition instrument; retrieving a predetermined transversal distance from the longitudinally-aligned feature at which to extract a relevant distance from the distance set; extracting a range point in the distance set at the predetermined transversal distance from the position of the longitudinally-aligned feature; adding the extracted range point to generate a longitudinal distance set at a constant transversal distance from the longitudinal feature.

In one embodiment, the processor further being for retrieving an image, wherein the retrieving the position of the longitudinally-aligned feature comprises detecting a location of the longitudinal feature in the image.

In one embodiment, the retrieving the position of the longitudinally-aligned feature comprises detecting a location of the longitudinal feature in the distance set generated by the multipoint range sensor using the distance between the instrument and the surface at the longitudinally-aligned feature.

In one embodiment, the acquisition instrument further comprises an elevation sensor for measuring a total elevation of both the surface and the acquisition instrument at least at the predetermined transversal distance from the position of the longitudinally-aligned feature; the processor further being for subtracting the distance between the acquisition instrument and the surface acquired by the acquisition instrument from the total elevation measured by the elevation sensor to determine a surface elevation of the surface and for adding the surface elevation to generate a surface elevation set at a constant transversal distance from the longitudinal feature.

In one embodiment, the acquisition instrument includes a pitch finder, the pitch finder being adapted to measure a pitch angle of the acquisition instrument in the longitudinal direction versus gravity, wherein the multipoint range sensor includes two multipoint range sensors, the two multipoint range sensors being a first sensor with a first field of view and a second sensor with a second field of view, the first field of view partly overlapping the second field of view in the transversal direction at an overlap, the first field of view being separated by a separation length from the second field of view at the overlap in the longitudinal direction; wherein the processor is further adapted to determine a surface elevation of the surface using the pitch angle and an overlapping transversal point in the overlap in the first field of view and in the second field of view and the separation length and for adding the surface elevation to generate a surface elevation set at a constant transversal distance from the longitudinal feature.

According to another broad aspect of the present invention, there is provided a method for measuring a distance to a surface along a longitudinal direction of the surface using an acquisition instrument while compensating for variations in a transverse position of the acquisition instrument, the surface having a longitudinally-aligned feature. The method comprises retrieving a predetermined transversal distance from the longitudinally-aligned feature at which to extract a relevant distance; for each position of a plurality of positions along the longitudinal direction, retrieving a distance set including a multitude of transversal points, the transversal points each being a distance between the acquisition instrument and the surface along a transversal direction; retrieving a position of the longitudinally-aligned feature of the surface relative to the distance set; extracting a range point in the distance set at the predetermined transversal distance from the position of the longitudinally-aligned feature; adding the extracted range point to generate a longitudinal distance set at a constant transversal distance from the longitudinal feature.

In one embodiment, retrieving the position of the longitudinally-aligned feature comprises detecting a location of the longitudinal feature in an image.

In one embodiment, the detection a location of the longitudinal feature in an image includes using an intensity of the longitudinally-aligned feature in one of a grey-scale image, a color image and a range image.

In one embodiment, retrieving the position of the longitudinally-aligned feature comprises detecting a location of the longitudinal feature in the distance set using the distance between the instrument and the surface at the longitudinally-aligned feature.

In one embodiment, the method further comprising retrieving a total elevation of both the surface and the acquisition instrument at least at the predetermined transversal distance from the position of the longitudinally-aligned feature; subtracting the distance between the acquisition instrument and the surface from the total elevation to determine a surface elevation of the surface; adding the surface elevation to generate a surface elevation set at a constant transversal distance from the longitudinal feature.

In one embodiment, the method further comprises combining the surface elevation set and the longitudinal distance set to create a longitudinal 3D profile.

In one embodiment, retrieving the distance set includes retrieving a first distance set and a second distance set, at least a portion of the transversal points of the first distance set being aligned transversally with at least a portion of the transversal points of the second distance set thereby creating a transversal overlap of the first and second distance sets, the first distance set and the second distance set being acquired at separate positions along the longitudinal direction, the separate positions being separated by a separation length; retrieving a pitch angle of the acquisition instrument in the longitudinal direction versus gravity; calculating a local slope of the surface using an overlapping transversal point in the transversal overlap in the first distance set and in the second distance set, the pitch angle and the separation length; calculating a height variation using the local slope and a longitudinal distance between consecutive ones of the plurality of positions along the longitudinal direction; adding the height variation to generate a surface height set at a constant transversal distance from the longitudinal feature.

In one embodiment, the method further comprises combining the surface height set and the longitudinal distance set to create a longitudinal 3D profile.

According to another broad aspect of the present invention there is provided a system for measuring a distance to a surface along a longitudinal direction of the surface using an acquisition instrument while compensating for low speed variations of the acquisition instrument, the system comprising: an acquisition instrument including: a pitch finder, the pitch finder being adapted to measure a pitch angle of the acquisition instrument in the longitudinal direction versus gravity; two multipoint range sensors, the two multipoint range sensors including a first sensor and a second sensor, the first multipoint range sensor acquiring the distance between the acquisition instrument and the surface in a first field of view at a first multitude of transversal points, thereby acquiring a first distance set, the second multipoint range sensor acquiring the distance between the acquisition instrument and the surface in a second field of view at a second multitude of transversal points, thereby acquiring a second distance set, the first and second field of view having a transversal dimension and a longitudinal dimension along the longitudinal direction of the surface, the transversal dimension being longer than the longitudinal dimension, the first field of view partly overlapping the second field of view in the transversal direction at an overlap, the first field of view being separated by a separation length from the second field of view at the overlap in the longitudinal direction; a translation mechanism for displacing the acquisition instrument to allow the acquisition instrument to acquire the first and second distance set at a plurality of positions along the longitudinal direction; a processor for: extracting a range point in the first distance set at a predetermined transversal position; adding the extracted range point to generate a longitudinal distance set; determining a surface elevation of the surface using the pitch angle and an overlapping transversal point in the overlap in the first field of view and in the second field of view and the separation length; adding the surface elevation to the longitudinal distance set to generate a surface elevation set.

According to still another broad aspect of the present invention, there is provided a method for measuring a distance to a surface along a longitudinal direction of the surface using an acquisition instrument while compensating for low speed variations of the acquisition instrument, the method comprising: for each position of a plurality of positions along the longitudinal direction, retrieving a first distance set including a first multitude of transversal points and a second distance set including a second multitude of transversal points, the transversal points each being a distance between the acquisition instrument and the surface along a transversal direction, at least a portion of the transversal points of the first distance set being aligned transversally with at least a portion of the transversal points of the second distance set thereby creating a transversal overlap of the first and second distance sets, the first distance set and the second distance set being acquired at separate positions along the longitudinal direction, the separate positions being separated by a separation length; extracting a range point in the first distance set at a predetermined transversal position; adding the extracted range point to generate a longitudinal distance set; retrieving a pitch angle of the acquisition instrument in the longitudinal direction versus gravity; calculating a local slope of the surface using an overlapping transversal point in the transversal overlap in the first distance set and in the second distance set, the pitch angle and the separation length; calculating a height variation using the local slope and a longitudinal distance between consecutive ones of the plurality of positions along the longitudinal direction; adding the height variation to the longitudinal distance set to generate a surface height set.

BRIEF DESCRIPTION OF THE DRAWINGS

Having thus generally described the nature of the invention, reference will now be made to the accompanying drawings, showing by way of illustration example embodiments thereof and in which:

FIG. 7 shows an example method used to compensate the lateral shifts of the inspection vehicle;

FIG. 8 shows an intensity profile captured by an example system;

FIG. 9 shows the overlap between the fields of view of the sensors of an example configuration;

FIG. 10 shows how the information from the overlap can serve to determine the slope and the change in elevation of the collected data in a single acquisition;

FIG. 11 shows how the information from the overlap can be used in consecutive acquisitions to estimate the slope;

It will be noted that throughout the appended drawings, like features are identified by like reference numerals.

DETAILED DESCRIPTION

The proposed method detects the position of longitudinal features such as lane markings present on the road surface and uses this information to compensate for the variations in the transverse position of the inspection vehicle and therefore the acquisition instrument with respect to these longitudinal features. A transversely oriented multipoint range sensor is mounted on the survey vehicle in order to measure the distance between the vehicle and the surface. The multipoint range sensor can also be adapted to detect the presence of lane markings. The field of detection of the range sensor can have partial or full lane width.

Although described in relation with a road surface which bears lane markings and on which cars and trucks can circulate, the present method and system can be applied to any type of surface, such as a road, an airport runway, a tunnel lining, a train track, etc. The translation mechanism which displaces the sensors to acquire distance information at a plurality of positions along the longitudinal direction can be a car or truck if the surface is a road but can also be any type of vehicle, man driven or robotized, such as a train wagon, a plane, a subway car, a displaceable robot, etc.

Figure 1:
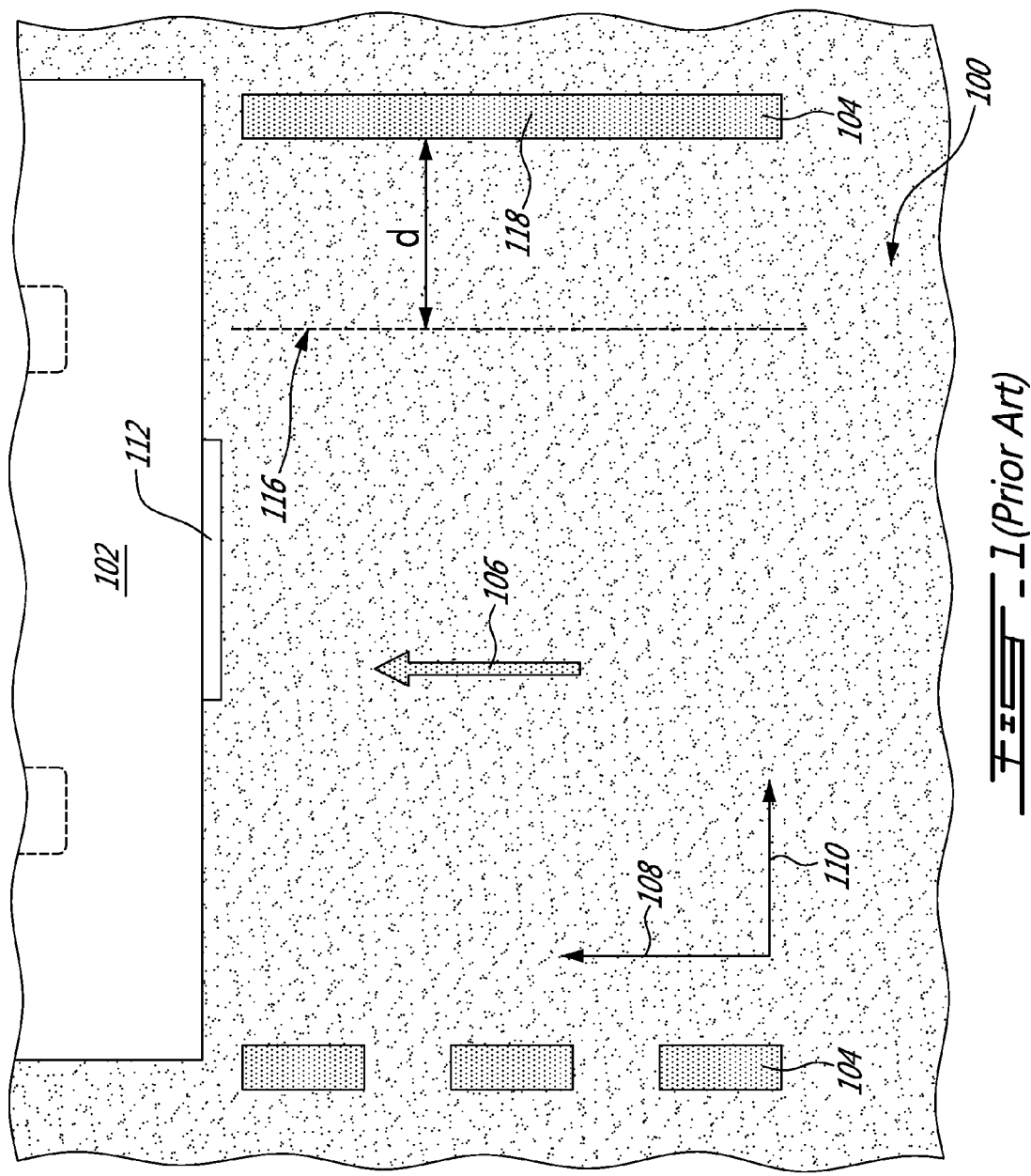
FIG. 1 (Prior Art) shows the longitudinal profile measurement trajectory in the ideal case.
Figure 2:
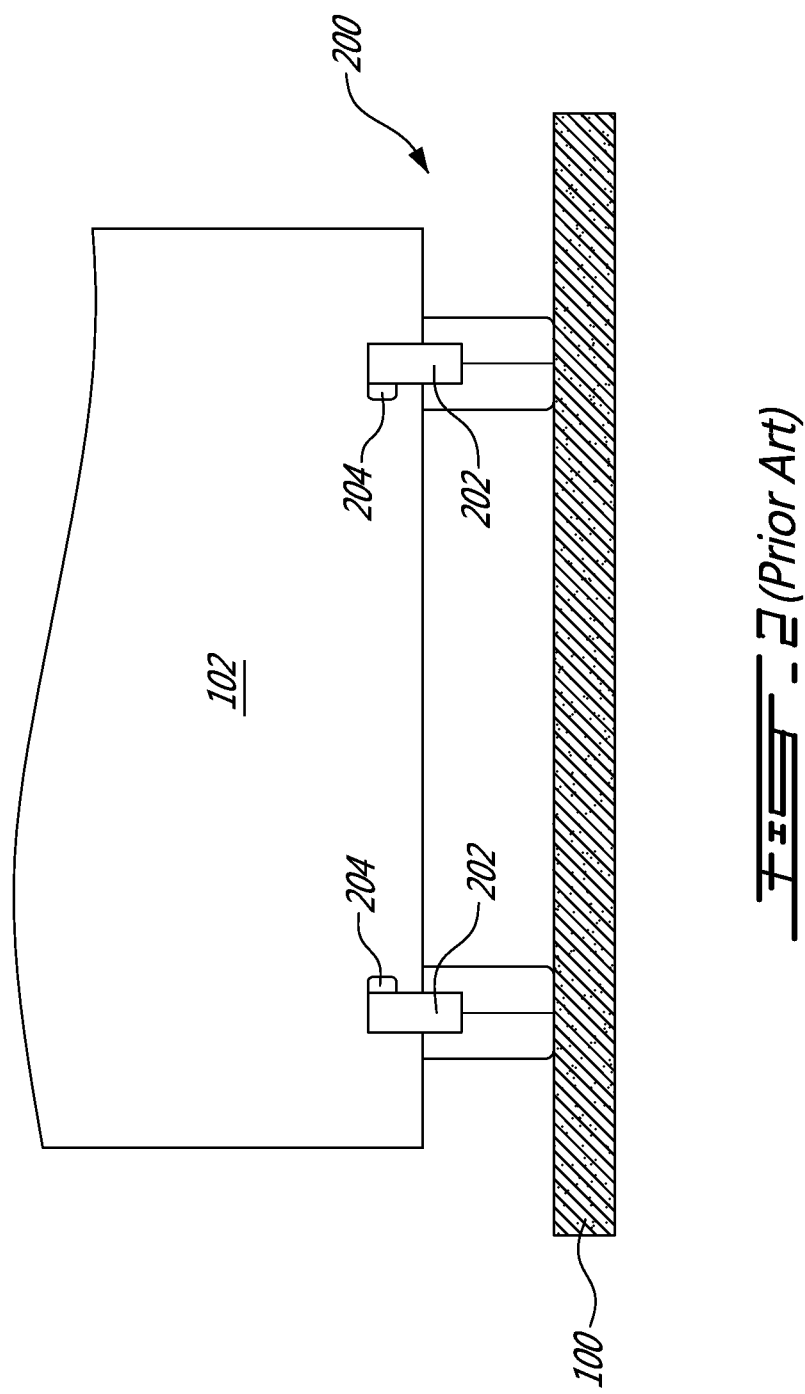
FIG. 2 (Prior Art) illustrates an acquisition instrument used to measure the longitudinal profile of the road which uses two single-point 3D sensors.
Figure 3:
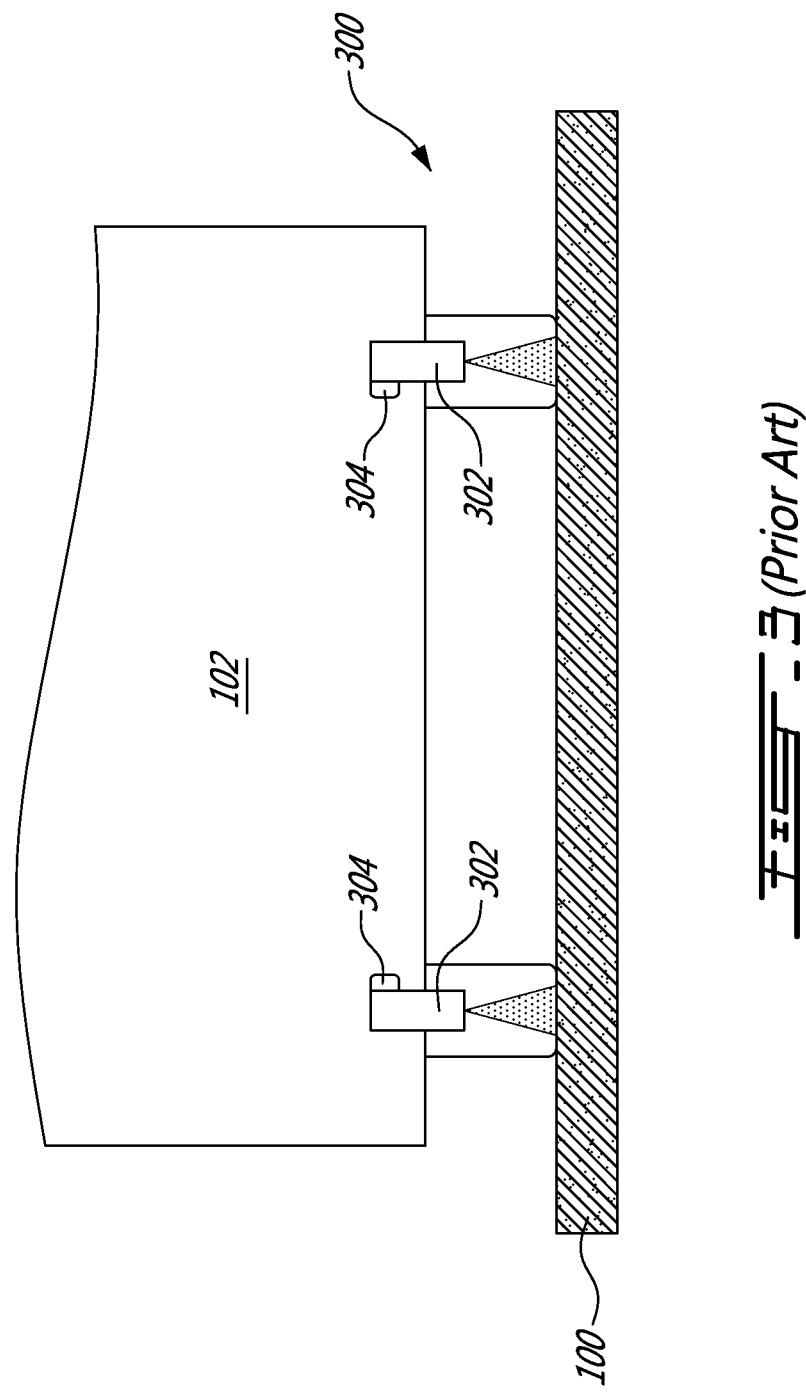
FIG. 3 (Prior Art) shows an alternative configuration for the longitudinal profile measurement instrument using a line of 3D sensors.
Figure 4:
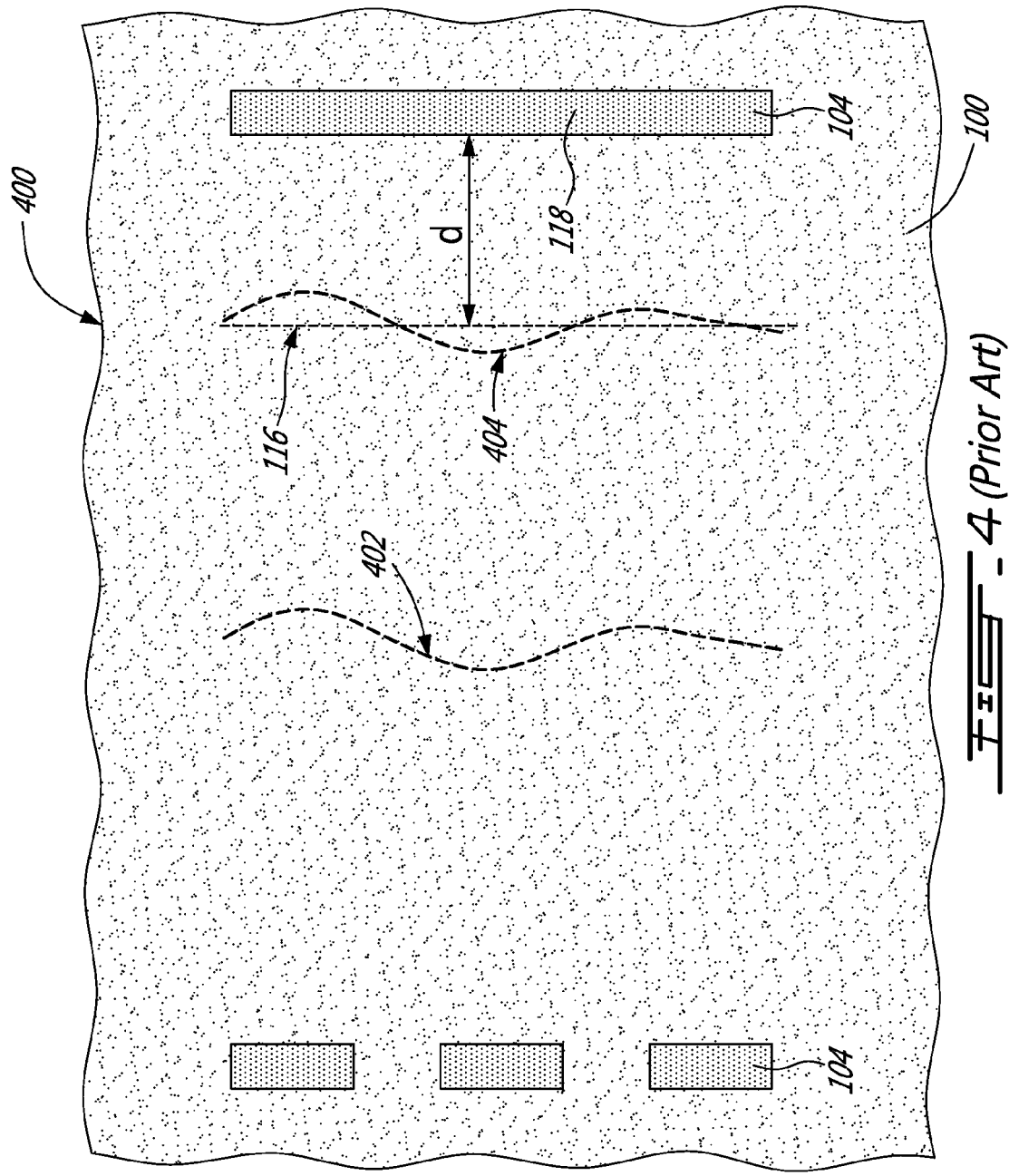
FIG. 4 (Prior Art) shows the longitudinal profile measurement trajectory with a single point system when lateral movement of the acquisition instrument is present.
Figure 5:
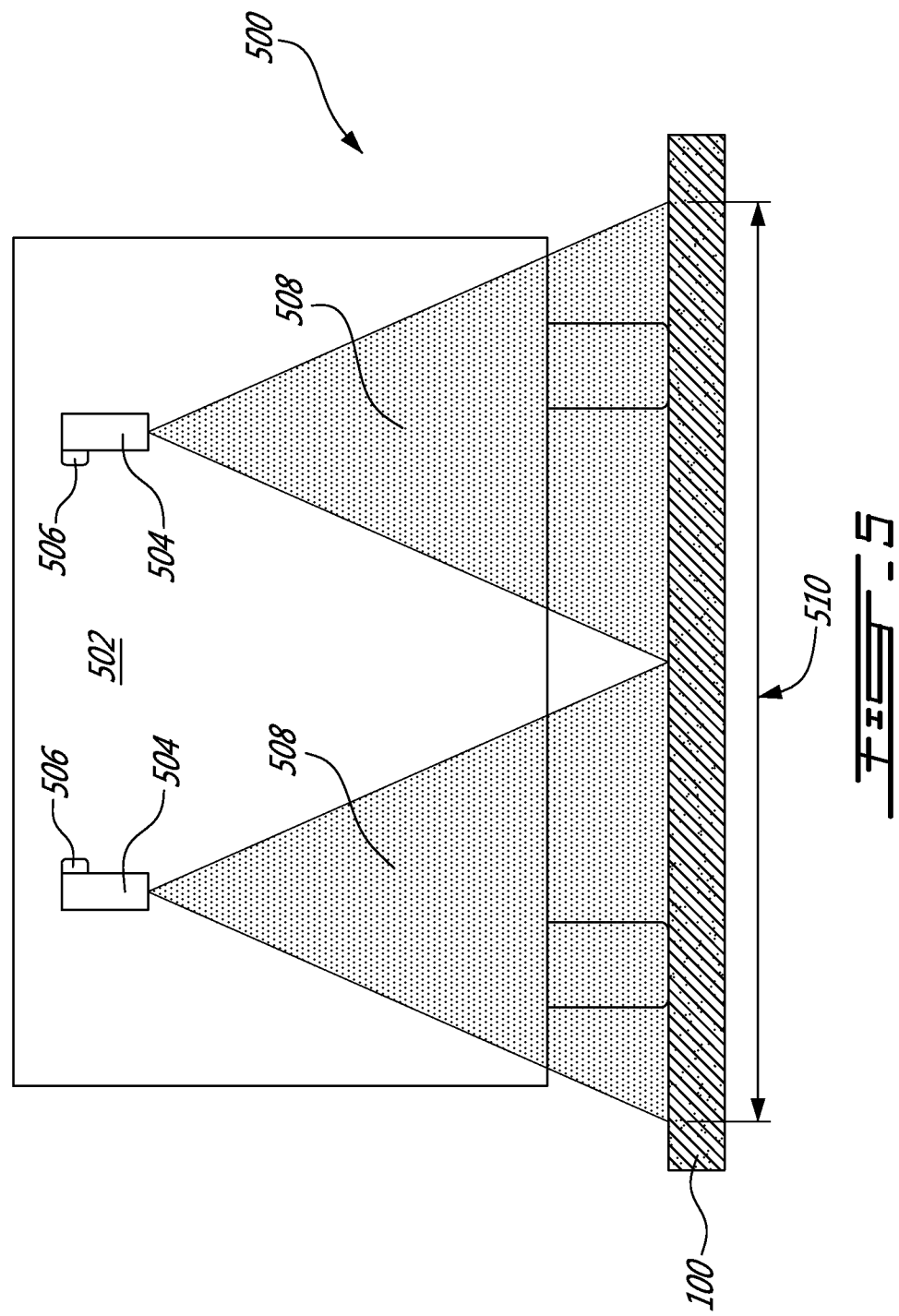
FIG. 5 shows an example configuration for the acquisition instrument which allows to capture a full width transversal profile.

In order to calculate longitudinal profiles, the multipoint laser range sensor can also be equipped with accelerometers or IMUs to measure the elevation changes of the road and the vertical oscillations of the inspection vehicle. FIG. 5 shows an example configuration of the inspection vehicle 502 and profiler acquisition instrument 500 for the generation of a lateral movement compensated longitudinal profile. The system includes two high speed 3D sensors 504 having fields of view 508 covering the width of the road 510. The system can also include IMUs 506. This configuration allows referencing of a measurement with respect to a tracking feature in the transversal profile.

The high speed 3D sensors can be any type of multipoint range sensors, such as triangulation based laser line profilers, scanning point laser profilers, lidar based scanning point laser profilers, etc. The multipoint range sensors acquire distance information at a multitude of transversal points in their field of view to create a distance set.

The IMUs are a type of elevation sensors. Global positioning system (GPS) receivers are another type of elevation sensors. The elevation sensors can generally be multi-axis accelerometers or vertically oriented single axis accelerometers.

The longitudinally-aligned tracking feature could already be present in the road infrastructure or could be added for the purpose of tracking the trajectory of the acquisition instrument. Examples of existing features are lane markings and reflectors. Road surface features such as ruts, texture or road side transitions (drop-off, edge, curb), a joint, a concrete slab edge, a road wheel path position, a road rut shape, a rail, a rail tie etc. could also be used as tracking features. In the case of ruts, the center of the rut corresponds to the wheel path and can be the measurement point for the IRI. Examples of added features are painted markings such as dots or lines used for guiding the measurement process.

The elevation and positional information could also be provided by an elevation sensor, for example a Global Navigation Satellite System (GNSS) such as GPS, GLONASS or Galileo.

Using feature tracking and a predefined distance relative to the feature one can extract the desired 3D measurement from the complete or almost complete transversal 3D profile. This process is repeated for each successive transverse profile to create the longitudinal road profile where the lateral shift of the inspection vehicle has been compensated for.

Figure 6:
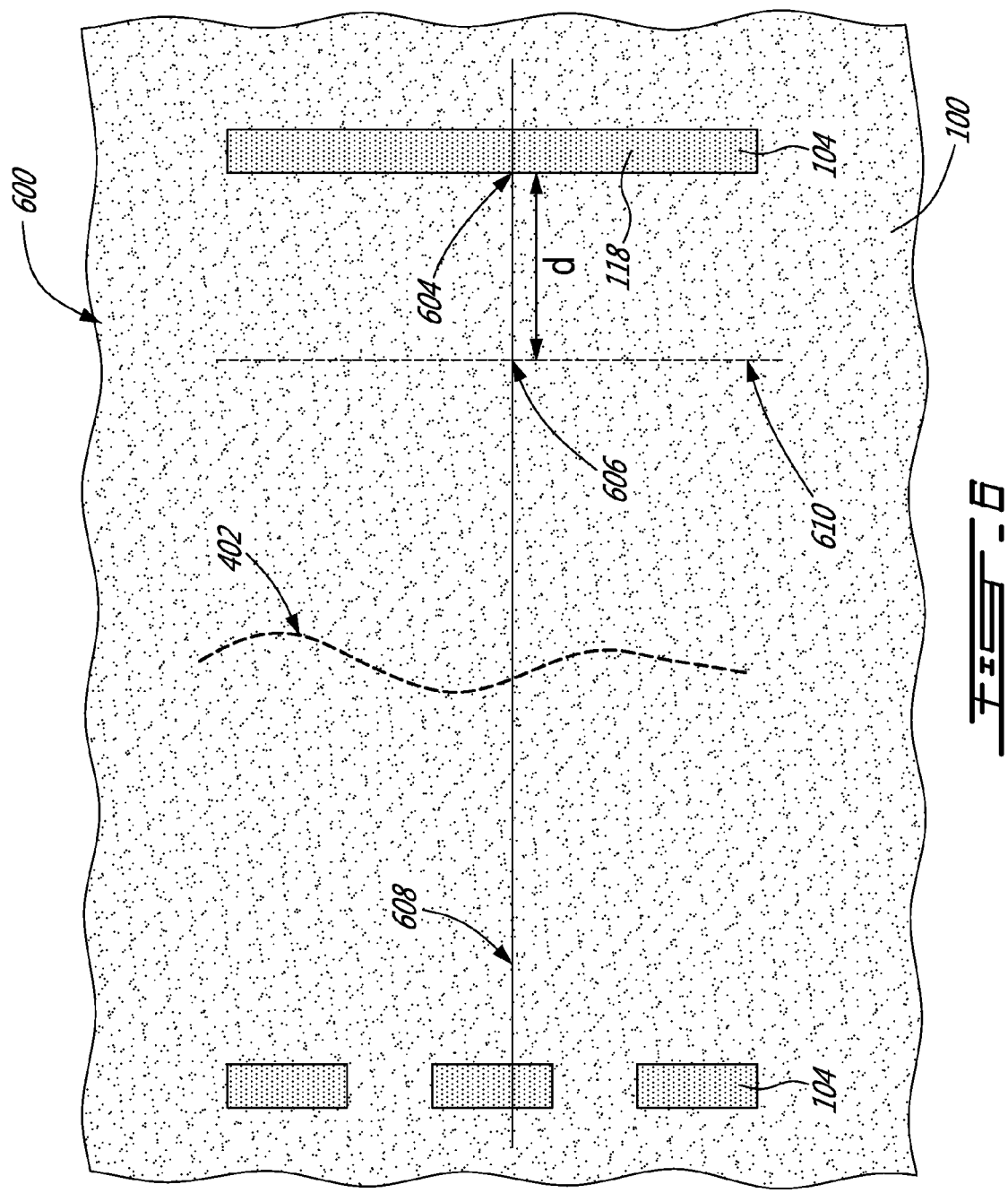
FIG. 6 illustrates the extraction of the 3D point on the ideal trajectory using the 3D transversal profile captured by the example acquisition instrument of FIG. 5 and feature tracking.

FIG. 6 illustrates the extraction of the 3D point on the ideal trajectory 600 using the 3D transversal profile captured by the example acquisition instrument of FIG. 5 and feature tracking. It compensates for the lateral shift, also known as the variation in transverse position, of the inspection vehicle. In this example case, the lane marking on the right-hand side 118 was tracked to compensate for the vehicle's lateral movement. The vehicle trajectory 402 is still wavy. However, the tracking feature is localized 604 and the 3D point 606 located at a distance d from the tracking feature can be extracted from the 3D transversal profile 608. The resulting longitudinal profile where lateral shifts have been compensated for 610 is along a proper longitudinal trajectory.

FIG. 7 shows an example method 700 used to compensate the lateral shift of the inspection vehicle. The transversal 3D profile is acquired 702. The tracking feature is located in either the transversal 3D profile or an intensity profile or in both using signal processing algorithms 704. The 3D point located at a predetermined distance "d" from the tracking feature is extracted from the transversal 3D profile 706. The extracted 3D point is added to the longitudinal profile of the road 708. The four steps are repeated for each successive transversal 3D profile acquired in the survey as the vehicle travels and therefore moves the acquisition instrument in order to obtain the complete longitudinal profile.

The intensity profile can be created from the transversal 3D profile, for example using a line by line 2D intensity profile or can be an intensity image obtained by an additional sensor, such as a still camera or a video camera.

In a simplified version of this example method 700, the position of the longitudinally-aligned feature of the surface relative to the field of view of the acquisition instrument is retrieved for each of a plurality of longitudinal positions. The predetermined transversal distance from the longitudinally-aligned feature at which to extract a relevant distance from the distance set is retrieved. A range point is extracted in the distance set at the predetermined transversal distance from the position of the longitudinally-aligned feature. The extracted range point is the relevant distance from the distance set. The extracted range point is added to generate a longitudinal distance set at a constant transversal distance from the longitudinal feature.

It will be readily understood that the position of the longitudinally-aligned feature of the surface relative to the field of view of the acquisition instrument can be retrieved at some of the longitudinal positions and extrapolated to be used at other longitudinal positions. This is particularly useful when the longitudinally-aligned feature is discontinued in some sections along the longitudinal direction. For example, a dashed line on a road surface would be an example of a discontinued longitudinally-aligned feature for which the position of the feature needs to be extrapolated from visible portions of the feature.

Using the acceleration and angular rate measured by the IMU and proper signal processing, one can estimated the pitch and roll of the inspection vehicle. By combining the vehicle orientation information (pitch and roll) and the 3D measurements from the sensors, the road shape can be estimated and thus the elevation profile at the selected location can be extracted.

The tracking feature can be detected in the transversal 3D profile using one or both of the intensity and the range information captured in the 3D profile.

In the case where the tracking feature to be extracted is a marking painted on the road, the intensity data from the sensor or a camera can be used. For example, the 3D sensors may be able to determine the intensity of the light reflected back from the surface. This intensity data can be transformed into an image in grey-scale. Alternatively, the intensity can be from a color or a black and white obtained using an external camera or device or a range image. Generally, the marking will have a higher intensity than the pavement. A simple threshold operation can thus be applied to extract the location of the marking.

Alternatively, the height of the paint for the painted lane marking could be differentiated from the height of the surrounding road surface. If the longitudinal feature is a joint of a concrete slab on a concrete road, the longitudinal joint with a height lower than the surrounding surface, could be detected and tracked as the tracking feature. In the case of a rut, the presence of the deepest point in a rut on an asphalt road surface could serve as the longitudinal feature to be tracked.

In order to determine the distance d, the lane width can be supplied by the user or measured by detecting the lane marking on the road. The distance between the two wheel paths of the inspection vehicle is also known. From these two values, the distance d from the lane marking at which to take the inspection data can be computed as (Lane_Width−Wheel_path_distance)/2. The distance d could also be supplied by the user to suit the requirements of the application.

As will be readily understood, once the tracking feature has been detected and d is known, it is possible to extract the 3D point in the 3D profile using signal processing algorithms.

FIG. 8 shows an intensity profile 800 captured by an example system. The intensity of the image is graphed as a function of the pixel index in the transversal direction. The intensity threshold 802 for the detection of the lane marking is identified at an intensity of 175 gray levels, 255 being the maximum value in the image. The captured intensity profile 804 contains a section 806 for which the intensity is higher than the pre-determined intensity threshold. Because the system is known to have imaged the lane marking, this section which has a higher intensity than the threshold is identified to be the lane marking 808. The chosen pixel 810 at a pre-determined distance d from the feature identified in the intensity profile is also identified. The pixel index 812 for the chosen pixel can be extracted. Then, the pixel index can be used to extract the 3D point in the 3D transversal profile and add it to the longitudinal profile.

For example, in one test trial, the difference between the reference IRI value measured with a walking profiler and an example system for measuring the IRI installed on a truck was reduced from 10% to 3% using the present compensation for lateral movement of the acquisition instrument using feature tracking.

As will be readily understood, the compensation for the variation in transverse position of the acquisition instrument can be done in real-time, as the data is being acquired by the multipoint range sensor. Alternatively, the compensation can be performed off-line, after acquisition along the longitudinal direction has ended and data has been retrieved from the acquisition instrument. It will be understood that the connection between the acquisition instrument and the processor which calculates the compensation and applies it to the acquired data can be a wired or wireless connection. The processor can be provided as part or external to the acquisition instrument. Additionally, the communication between the two devices can be carried over a network. Processing of the data can be split in sub-actions carried out by a plurality of processors for example using cloud computing capabilities.

In order to compensate for low speed variations of the translation mechanism, it is possible to measure the elevation profile of the road without using accelerometers provided there is a pitch finder instrument (for example a gyroscope, GPS or GNSS) which measures the pitch of the acquisition instrument 502 in the longitudinal direction (or direction of translation) relative to gravity and provided there is an overlap between the field of view of the sensors 504 in the instrument. This can be useful at low speed (for example at a speed less than 25 km/hr) where the weak vertical accelerations of the vehicle are not accurately measured by the accelerometers.

This low speed compensation can be performed independently of the compensation for variations in the transversal direction, without tracking a longitudinal feature or can be combined with it to yield a longitudinal distance set which is compensated for both the lateral movements of the acquisition instrument and the low speed displacement along the longitudinal direction.

FIG. 9 shows a schematic representation 1100 of the fields of view of the two sensors of the instrument which overlap and shows how this overlap can serve to determine the elevation. The overlap of the fields of view is shown at 1102. The right hand side of the field of view of the left sensor 1104 overlaps with the left hand side of the field of view of the right sensor 1106. The overlap is a transversal overlap, meaning that a plurality of points acquired by the multipoint range sensor is acquired by both sensors. The sensors are separated by a separation length $d_o$ in the longitudinal direction.

In FIG. 9, the fields of view of the 3D sensors are shown to be at an angle to the travel direction and not strictly aligned with the transversal direction. They are still provided along the transversal direction within the meaning of this specification. This is useful in preventing that each sensor captures the laser trace of the other sensor. It also allows a better capture of transversally aligned defects in the road surface and allows a better calculation of the slope. The angle of the 3D sensors with respect to the transversal direction can be any angle chosen between 0° and ±45°. They could be provided at 15° to the transversal direction, for example. Also, as it apparent from FIG. 9, the 3D sensors can be provided with an overlap in the transversal direction and placed at a separation length from one another in the longitudinal direction. As will be readily understood, even if only one 3D sensor was being used, it could still be provided at an angle to the transversal direction. As will also be readily understood, even if two 3D sensors are not provided with an overlapping field of view, they could still be provided at an angle to the transversal direction. Moreover, two 3D sensors could be provided with an overlapping field of view even if the present method for compensating for low speed displacement of the acquisition instrument is not performed.

As shown in FIG. 10, the overlap 1102 allows measuring 1200 the local slope (θ') between the instrument 502 and the surface 100 using the distance of the overlap $d_o$ and the difference between the heights of the captured data Δh (Δh=$h_1$−$h_2$) at each sensor. The height $h_2$ captured by the left sensor is subtracted from the height $h_1$ captured by the right sensor.

Figure 12:
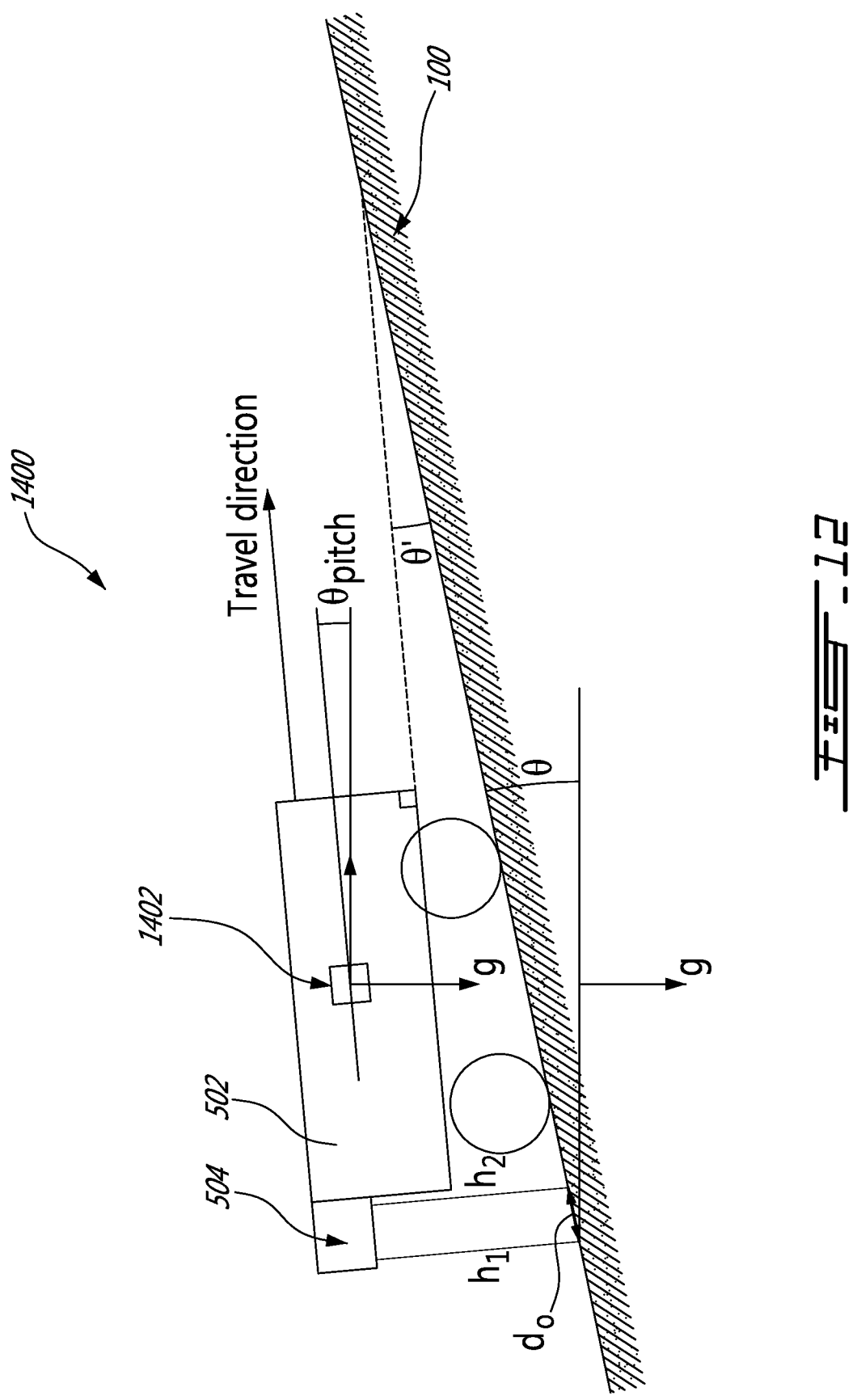
FIG. 12 shows a vehicle climbing a hill while acquiring data and the relevant angles used for the calculation of the estimated slope.

FIG. 12 shows the relationship between the pitch of the instrument versus gravity ($\theta_{pitch}$), the slope between the instrument and the road (θ') and the real local slope of the road (θ) 1400. Using pitch finder instrument 1402 (for example a gyroscope, GPS or GNSS) to measure the pitch ($\theta_{pitch}$) and adding the slope (θ') measured by the sensors gives the local slope of the road versus gravity (θ). From this slope and knowing the distance traveled ($d_i$) between two successive profiles, one can estimate the real height variation of the road ($h_i$). The elevation profile can be created by repeating this process for each successive transversal profile as follows:

$$\Delta h = h_1 - h_2$$

$$\theta' = a\tan(\theta h/d_o)$$

$$\theta = \theta_{pitch} + \theta'$$

$$h_i = d_i \times \tan(\theta)$$

FIG. 11 further illustrates the estimation of the elevation profile using the field of view overlap. Elevations $h_{1i}$ and $h_{2i}$ are measured simultaneously by left and right sensors respectively. The local slope of the road surface can be estimated using these two measurements and knowing the distance traveled ($d_i$) between two successive profiles, the elevation change ($h_i$) can also be estimated. The elevation profile will then be:

$$\text{Elevation profile} = [0, h_{i1}, h_{i1}+h_{i2}, h_{i1}+h_{i2}+h_{i3}, \ldots]$$

Figure 13:
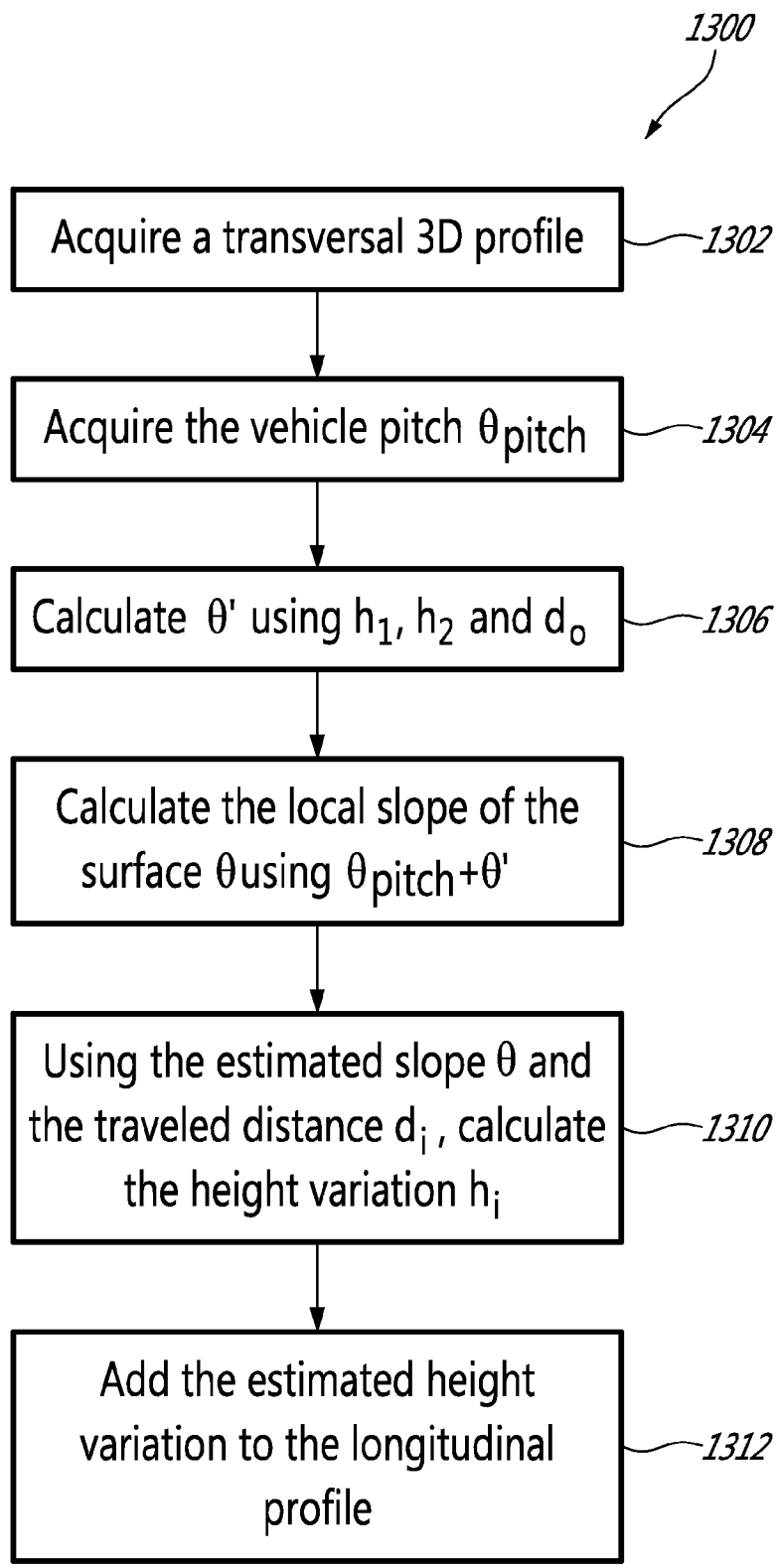
FIG. 13 shows an example method used to obtain the elevation profile for the longitudinal profile when the fields of view of the sensors overlap.

FIG. 13 shows an example method for obtaining the height information 1300. The transversal 3D profile is acquired 1302. The instrument (or vehicle) pitch is acquired 1304. The slope θ' is calculated using $h_1$, $h_2$ and $d_o$ 1306. The local slope of the road θ is calculated by adding θ' to $\theta_{pitch}$ 1308. Using the estimated slope θ and the traveled distance $d_i$, the height variation $h_i$ is calculated 1310. The estimated height variation is added to the longitudinal profile 1312.

EXAMPLE

In an example practical application, the lane of the road to be inspected typically has a width of 3.6 m. The length of the road along the longitudinal direction can be anywhere from a few meters to tens of kilometers. The predefined distance d from the lane marking at which to take inspection measurements is 90 cm. The inspection vehicle on which are installed the 3D sensors will travel at speeds up to 100 km/hr.

In an example system for the inspection, the 3D sensors have a transversal field of view at the road surface of 2 m with a longitudinal width for their field of view of 1 mm. They are installed at a height of about 2 m, on an inspection vehicle.

The inspection vehicle can travel at speeds up to 100 km/h. The 3D sensors have a sampling rate of 5 600 profiles per second in the longitudinal direction. The sampling spacing can be 1 to 5 mm and is adjustable. There are 4096 transversal sampling points with a transversal field of view of 4 m and a transversal resolution of 1 mm. The depth accuracy is 0.5 mm. The overlap $d_o$ is 50 cm.

In this example system, the 3D sensors are laser profile scanners for 2D profiles. Acuity™ is a manufacturer of such non-contact laser scanning profilometers. In this example system, if IMUs are included, they can be obtained, for example, from the manufacturer STMicroelectronics™. An example IMU which would adequate for the present system is model LSM330D. The LSM330D is a system-in-package featuring a 3D digital accelerometer and a 3D digital gyroscope. The LSM330D has dynamically user-selectable full scale acceleration range of ±2 g/±4 g/±8 g/±16 g and angular rate of ±250/±500/±2000 deg/sec.

The embodiments described above are intended to be exemplary only. The scope of the invention is therefore intended to be limited solely by the appended claims.

We claim:

1. A system for measuring a distance to a surface along a longitudinal direction of said surface using an acquisition instrument while compensating for variations in a transverse position of the acquisition instrument, said surface having a longitudinally-aligned feature, said system comprising:
   an acquisition instrument including
      a multipoint range sensor acquiring said distance between said acquisition instrument and said surface, said multipoint range sensor acquiring said distance in a field of view of said acquisition instrument at a multitude of transversal points, thereby acquiring a distance set, said field of view having a transversal dimension and a longitudinal dimension along said longitudinal direction of said surface, said transversal dimension being longer than said longitudinal dimension;
      an elevation sensor for measuring a total elevation of both said surface and said acquisition instrument;
   a translation mechanism for displacing said acquisition instrument to allow said acquisition instrument to acquire said distance set at a plurality of positions along said longitudinal direction;
   a processor for:
      retrieving a position of said longitudinally-aligned feature of the surface relative to the field of view of the acquisition instrument;
      retrieving a predetermined transversal distance from said longitudinally-aligned feature at which to extract a relevant distance from said distance set;
      extracting a range point in said distance set at said predetermined transversal distance from said position of said longitudinally-aligned feature;
      adding the extracted range point to generate a longitudinal distance set at a constant transversal distance from said longitudinal feature;
      subtracting said distance between said acquisition instrument and said surface acquired by said acquisition instrument from said total elevation measured by said elevation sensor to determine a surface elevation of the surface; and
      adding the surface elevation to generate a surface elevation set at a constant transversal distance from said longitudinal feature.

2. The system as claimed in claim 1, wherein said translation mechanism is a vehicle and said surface is one of a road, an airport runway, a tunnel lining and a train track.

3. The system as claimed in claim 1, wherein said multipoint range sensor is one of a triangulation based laser line profiler, a scanning point laser profiler and a lidar based scanning point laser profiler.

4. The system as claimed in claim 1, wherein said longitudinal feature is at least one of a road lane marking, a road edge, a curb, a joint, a concrete slab edge, a road wheel path position, a road rut shape, a rail and a rail tie.

5. The system as claimed in claim 1, said processor further being for retrieving an image, wherein said retrieving said position of the longitudinally-aligned feature comprises detecting a location of said longitudinal feature in said image.

6. The system as claimed in claim 1, wherein said retrieving said position of the longitudinally-aligned feature comprises detecting a location of said longitudinal feature in said distance set generated by the multipoint range sensor using said distance between said instrument and said surface at said longitudinally-aligned feature.

7. The system as claimed in claim 1, wherein said elevation sensor measures said total elevation of both said surface and said acquisition instrument at least at said predetermined transversal distance from said position of said longitudinally-aligned feature.

8. The system as claimed in claim 7, wherein said elevation sensor is one of a multi-axis accelerometer, a vertically oriented single axis accelerometer, an inertial measurement unit (IMU) and a global positioning system (GPS) receiver.

9. The system as claimed in claim 1, wherein said acquisition instrument includes a pitch finder, said pitch finder being adapted to measure a pitch angle of said acquisition instrument in the longitudinal direction versus gravity, wherein said multipoint range sensor includes two multipoint range sensors, said two multipoint range sensors being a first sensor with a first field of view and a second sensor with a second field of view, said first field of view partly overlapping said second field of view in the transversal direction at an overlap, said first field of view being separated by a separation length from said second field of view at said overlap in said longitudinal direction; wherein said processor is further adapted to determine a surface elevation of the surface using the pitch angle and an overlapping transversal point in said overlap in said first field of view and in said second field of view and said separation length and for adding the surface elevation to generate a surface elevation set at a constant transversal distance from said longitudinal feature.

10. A method for measuring a distance to a surface along a longitudinal direction of said surface using an acquisition instrument while compensating for variations in a transverse position of the acquisition instrument, said surface having a longitudinally-aligned feature, said method comprising:
   retrieving a predetermined transversal distance from said longitudinally-aligned feature at which to extract a relevant distance;
   retrieving a total elevation of both said surface and said acquisition instrument;
   for each position of a plurality of positions along said longitudinal direction,
      retrieving a distance set including a multitude of transversal points, said transversal points each being a distance between said acquisition instrument and said surface along a transversal direction;

retrieving a position of said longitudinally-aligned feature of the surface relative to the distance set;
extracting a range point in said distance set at said predetermined transversal distance from said position of said longitudinally-aligned feature;
adding the extracted range point to generate a longitudinal distance set at a constant transversal distance from said longitudinal feature;
subtracting said distance between said acquisition instrument and said surface from said total elevation to determine a surface elevation of the surface; and
adding the surface elevation to generate a surface elevation set at a constant transversal distance from said longitudinal feature.

11. The method as claimed in claim 10, wherein said retrieving said position of the longitudinally-aligned feature comprises detecting a location of said longitudinal feature in an image.

12. The method as claimed in claim 11, wherein said detecting a location of said longitudinal feature in an image includes using an intensity of said longitudinally-aligned feature in one of a grey-scale image, a color image and a range image.

13. The method as claimed in claim 10, wherein said retrieving said position of the longitudinally-aligned feature comprises detecting a location of said longitudinal feature in said distance set using said distance between said instrument and said surface at said longitudinally-aligned feature.

14. The method as claimed in claim 10, wherein said retrieving said total elevation of both said surface and said acquisition instrument comprises retrieving said total elevation at least at said predetermined transversal distance from said position of said longitudinally-aligned feature.

15. The method as claimed in claim 14, further comprising:
combining said surface elevation set and said longitudinal distance set to create a longitudinal 3D profile.

16. The method as claimed in claim 10,
wherein said retrieving said distance set includes retrieving a first distance set and a second distance set, at least a portion of said transversal points of said first distance set being aligned transversally with at least a portion of said transversal points of said second distance set thereby creating a transversal overlap of said first and second distance sets, said first distance set and said second distance set being acquired at separate positions along said longitudinal direction, said separate positions being separated by a separation length;
retrieving a pitch angle of said acquisition instrument in the longitudinal direction versus gravity;
calculating a local slope of said surface using an overlapping transversal point in said transversal overlap in said first distance set and in said second distance set, said pitch angle and said separation length;
calculating a height variation using said local slope and a longitudinal distance between consecutive ones of said plurality of positions along said longitudinal direction;
adding the height variation to generate a surface height set at a constant transversal distance from said longitudinal feature.

17. The method as claimed in claim 16, further comprising:
combining said surface height set and said longitudinal distance set to create a longitudinal 3D profile.

18. A system for measuring a distance to a surface along a longitudinal direction of said surface using an acquisition instrument while compensating for low speed variations of the acquisition instrument, said system comprising:
an acquisition instrument including:
a pitch finder, said pitch finder being adapted to measure a pitch angle of said acquisition instrument in the longitudinal direction versus gravity;
two multipoint range sensors, said two multipoint range sensors including a first sensor and a second sensor, said first multipoint range sensor acquiring said distance between said acquisition instrument and said surface in a first field of view at a first multitude of transversal points, thereby acquiring a first distance set, said second multipoint range sensor acquiring said distance between said acquisition instrument and said surface in a second field of view at a second multitude of transversal points, thereby acquiring a second distance set, said first and second field of view having a transversal dimension and a longitudinal dimension along said longitudinal direction of said surface, said transversal dimension being longer than said longitudinal dimension , said first field of view partly overlapping said second field of view in the transversal direction at an overlap, said first field of view being separated by a separation length from said second field of view at said overlap in said longitudinal direction;
a translation mechanism for displacing said acquisition instrument to allow said acquisition instrument to acquire said first and second distance set at a plurality of positions along said longitudinal direction;
a processor for:
extracting a range point in said first distance set at a predetermined transversal position;
adding the extracted range point to generate a longitudinal distance set;
determining a surface elevation of the surface using the pitch angle and an overlapping transversal point in said overlap in said first field of view and in said second field of view and said separation length;
adding the surface elevation to the longitudinal distance set to generate a surface elevation set.

19. A method for measuring a distance to a surface along a longitudinal direction of said surface using an acquisition instrument while compensating for low speed variations of the acquisition instrument, said method comprising:
for each position of a plurality of positions along said longitudinal direction,
retrieving a first distance set including a first multitude of transversal points and a second distance set including a second multitude of transversal points, said transversal points each being a distance between said acquisition instrument and said surface along a transversal direction, at least a portion of said transversal points of said first distance set being aligned transversally with at least a portion of said transversal points of said second distance set thereby creating a transversal overlap of said first and second distance sets, said first distance set and said second distance set being acquired at separate positions along said longitudinal direction, said separate positions being separated by a separation length;
extracting a range point in said first distance set at a predetermined transversal position;
adding the extracted range point to generate a longitudinal distance set;
retrieving a pitch angle of said acquisition instrument in the longitudinal direction versus gravity;

calculating a local slope of said surface using an overlapping transversal point in said transversal overlap in said first distance set and in said second distance set, said pitch angle and said separation length;

calculating a height variation using said local slope and a longitudinal distance between consecutive ones of said plurality of positions along said longitudinal direction;

adding the height variation to the longitudinal distance set to generate a surface height set.

* * * * *